(12) United States Patent
Aslam et al.

(10) Patent No.: US 11,391,672 B1
(45) Date of Patent: Jul. 19, 2022

(54) COMPACT NON-DISPERSIVE INFRARED GAS ANALYZER

(71) Applicant: United States of America as represented by the Administrator of NASA, Washington, DC (US)

(72) Inventors: Shahid Aslam, Washington, DC (US); Daniel P. Glavin, Greenbelt, MD (US); Gerard T. Quilligan, Gulf Breeze, FL (US); Nicolas Gorius, Washington, DC (US); Perry A. Gerakines, Greenbelt, MD (US); John R. Kolasinski, Greenbelt, MD (US); Dat Tran, Washington, DC (US); Todd C. Purser, Greenbelt, MD (US)

(73) Assignee: United States of America as represented by the Administrator of NASA, Washington, DC (US)

(*) Notice: Subject to any disclaimer, the term of this patent is extended or adjusted under 35 U.S.C. 154(b) by 0 days.

(21) Appl. No.: 17/002,209

(22) Filed: Aug. 25, 2020

(51) Int. Cl.
| | | |
|---|---|---|
| *G01N 21/3518* | (2014.01) | |
| *G01L 11/02* | (2006.01) | |
| *G01N 1/22* | (2006.01) | |
| *G01N 21/3504* | (2014.01) | |

(52) U.S. Cl.
CPC .......... *G01N 21/3518* (2013.01); *G01L 11/02* (2013.01); *G01N 1/2205* (2013.01); *G01N 21/3504* (2013.01); *G01N 2201/0633* (2013.01)

(58) Field of Classification Search
CPC .................. G01N 21/3518; G01N 21/3504
See application file for complete search history.

(56) References Cited

U.S. PATENT DOCUMENTS

| | | | |
|---|---|---|---|
| 8,707,760 B2 * | 4/2014 | Chou | G01N 30/06 |
| | | | 73/23.4 |
| 11,092,488 B2 * | 8/2021 | Waddell | G01J 3/42 |
| 2008/0049228 A1 * | 2/2008 | Chan | G01J 3/42 |
| | | | 356/454 |

OTHER PUBLICATIONS

Tran et al. ,"Low-cost, compact, and robust gas abundance sensor package", Proc. SPIE 10641, Sensors and Systems for Space Applications XI, 106410Q (May 2, 2018); doi: 10.1117/12.2304639 (Year: 2018).*

Tran et al. "Radiation-hard parallel readout circuit for low-frequency voltage signal measurements", Proc. SPIE 11422, Sensors and Systems for Space Applications XIII, 1142205 (Apr. 23, 2020); doi: 10.1117/12.2558117 (Year: 2020).*

* cited by examiner

*Primary Examiner* — Edwin C Gunberg
(74) *Attorney, Agent, or Firm* — Christopher O. Edwards; Bryan A. Geurts; Helen M. Galus

(57) ABSTRACT

An apparatus for measuring vapor partial pressures of water and carbon dioxide includes a pair of infrared (IR) sources and a pair of quad filter detectors are placed opposite to one another such that the vapor partial pressures of water ($H_2O$) and carbon dioxide ($CO_2$) is measured and quantified in a short pathlength gas cell.

18 Claims, 9 Drawing Sheets

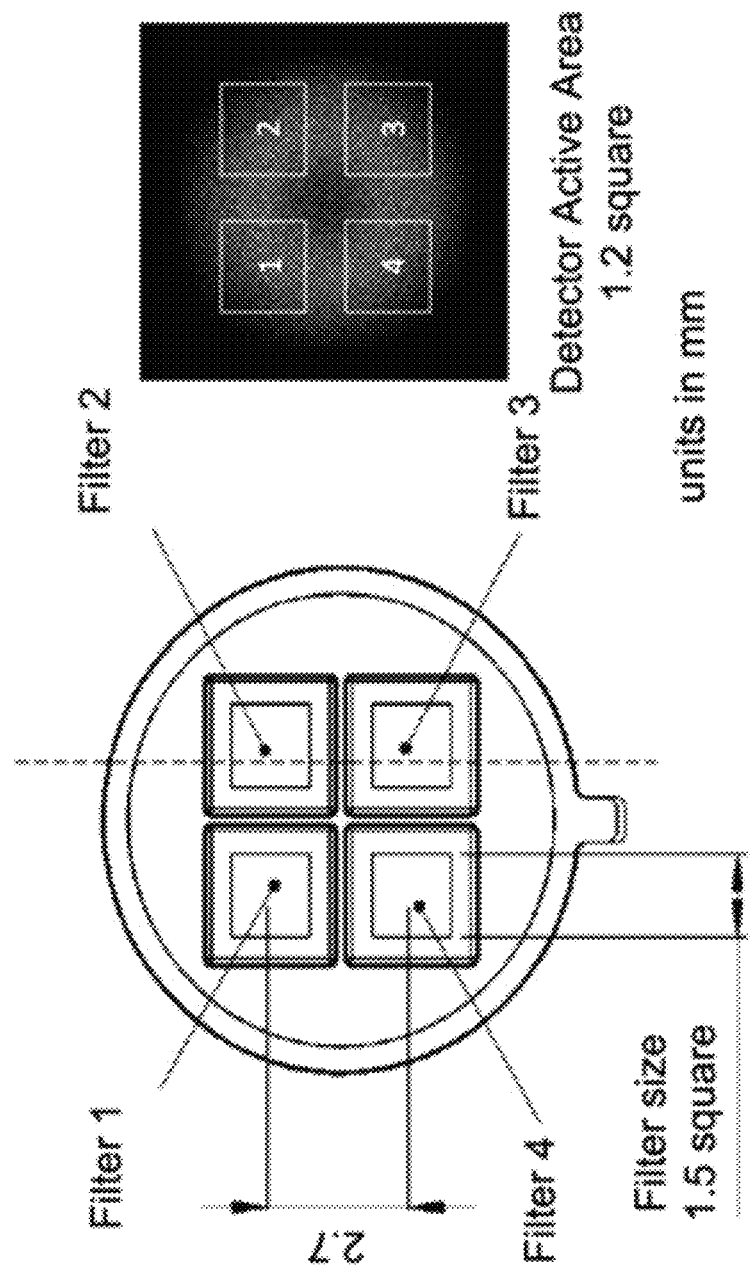

COMPACT NON-DISPERSIVE INFRARED GAS ANALYZER

STATEMENT OF FEDERAL RIGHTS

The invention described herein was made by employees of the United States Government and may be manufactured and used by or for the Government for Government purposes without the payment of any royalties thereon or therefore.

FIELD

The present invention relates to a gas analyzer, and more particularly, to a non-dispersive infrared gas analyzer (NDIRGA) configured to measure and quantify vapor partial pressures of water ($H_2O$) and carbon dioxide (CO2)

BACKGROUND

Non-dispersive infrared (NDIR) sensors operate by monitoring the absorption of infrared radiation through a target gas and determining what fraction of the incident radiation is absorbed, based on the Beer-Lambert Law, at a particular energy. The fraction of radiation absorbed depends on the pathlength occupied by the target gas, the wavelength of radiation being measured, and the molecule itself. The absorption arises from transitions in the vibrational-rotational energy levels of the target molecules. Such absorption only occurs if there is a change in dipole moment during these energy level transitions (that is, why diatomic symmetric molecules display no absorption in the gaseous state).

However, $H_2O$ and $CO_2$ molecules have vibration-rotational spectra and absorb radiation in the infrared region. The $H_2O$ molecule in the gas phase has three fundamental molecular vibrations in the mid-infrared. The O—H stretching vibrations gives rise to two absorption bands, i.e., asymmetric stretch band at 2.662 µm and a symmetric stretch band at 2.734 µm. The H—O—H bending mode gives rise to an absorption band at 6.269 µm. The fundamental $CO_2$ asymmetric stretch band is centered near 4.26 µm and consists of many strong rotational-vibrational absorption lines. These mid-infrared absorption features of $H_2O$ and $CO_2$ can be exploited by certain embodiments of the present invention, i.e., the NDIRGA.

Reviews of NDIR sensors have been given by many authors in the previous literature. NDIR sensors have the advantages of fast response time, high accuracy, and long life. Most gas sensors based on this technique detect a single gas. More recently, dual-gas devices have been presented especially with regard to environmental detector operation. The availability in recent years of cost effective, commercial, high sensitivity quad thermopile detectors with integrated passband filters enable three gas mixture detection and quantification. These quad thermopile detectors are ideal for the construction of a compact, rugged, NDIRGA system, as described in the embodiment of the present invention, for operation in extreme space environments. A NDIRGA sub-system was developed for the Comet Astrobiology Exploration Sample Return (CAESAR) mission, a potential candidate mission for a future NASA New Frontiers Program. If selected, this mission will acquire and return to Earth for laboratory analysis of at least 0.080 kg of surface material from the nucleus of comet 67P/Churyumov-Gerasimenko. CAESAR will characterize the comet surface region for sample acquisition, robotically acquire the sample, preserve the sample in a sample containment system (SCS), and capture evolved (sublimated) sample volatiles in a separate gas containment system (GCS). This protects both volatile and non-volatile components of the sample from contamination or alteration that would hinder their scientific laboratory analysis once returned to Earth. After sample acquisition and sealing, the SCS slowly warms the collected material from its ambient cold temperature. As gases evolve from the sample, they are passively cryo-pumped into a separate radiator-cooled GCS, via a transfer tube. Initial transfer experiments conducted inside a thermal vacuum chamber have shown that >99.99% of sublimated $H_2O$ can be captured inside a GCS cooled to less than 213 K while maintaining water pressure well below its triple point (4.58 Torr), preventing liquid or solid formation. Other known comet species such as $CH_3OH$ and $H_2CO$ have similar volatilities to water and should also condense as ice in the GCS. More volatile species (e.g., noble gases, $CO_2$, CO, $O_2$, HCN, $NH_3$, $CH_4$), with $CO_2$ as the largest percentage volume gas, will not solidify in the SCS or GCS.

The SCS temperature during gas transfer is controlled to enable $H_2O$ ice sublimation from the sample and prevent aqueous alteration of the most reactive amorphous silicate minerals (based on measured amorphous Mg-silicate powder gas-solid hydration rates, a sample temperature of 243 K requires completion of $H_2O$-ice transfer in ≤100 days. As a safety precaution, it is critical to monitor the $H_2O$ and $CO_2$ vapor partial pressures as a function of temperature in order to avoid an ice plug or liquid water production in the transfer tube. The NDIRGA 100 monitors and quantifies over time the partial pressure of $H_2O$ and $CO_2$ vapor as a function of temperature, in a gas cell located in the transfer tube, between the SCS and GCS, using two sets of thermopile detectors both integrated with filters, referred to as quad filter-detector, centered at 2.7 µm and 6.5 µm for $H_2O$ detection, 4.2 µm for $CO_2$ detection and 4.0 µm for a reference signal detection, each quad filter-detector is paired with an IR source. Depending on the embodiment, there may be one, two or a multitude of quad filter-detectors paired with IR sources. These measurements also establish optimal sublimated volatile (gas) transfer conditions and ensure safe volatile transfer protocols in order to keep the comet sample pristine.

Thus, a NDIRGA 100 configured to measure vapor partial pressures of $H_2O$ and $CO_2$ is needed.

SUMMARY

Certain embodiments of the present invention may provide solutions to the problems and needs in the art that have not yet been fully identified, appreciated, or solved by current gas analyzers. For example, some embodiments of the present invention pertain to NDIRGA configured to measure and quantify vapor partial pressures of $H_2O$ and $CO_2$ in a short pathlength gas cell with a low noise parallel detector readout scheme.

In an embodiment, an apparatus for measuring vapor partial pressures of water and carbon dioxide includes a pair of infrared (IR) sources and a pair of quad filter detectors are placed opposite to one another such that the vapor partial pressures of water ($H_2O$) and carbon dioxide ($CO_2$) is measured and quantified in a short pathlength gas cell.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1B shows the gas inlet and gas outlet scheme, according to an embodiment of the present invention.

FIG. 2D is a graph illustrating the dimensions of the quad filters and the quad detectors, according to an embodiment of the present invention.

DETAILED DESCRIPTION OF THE EMBODIMENTS

Figure 1A:
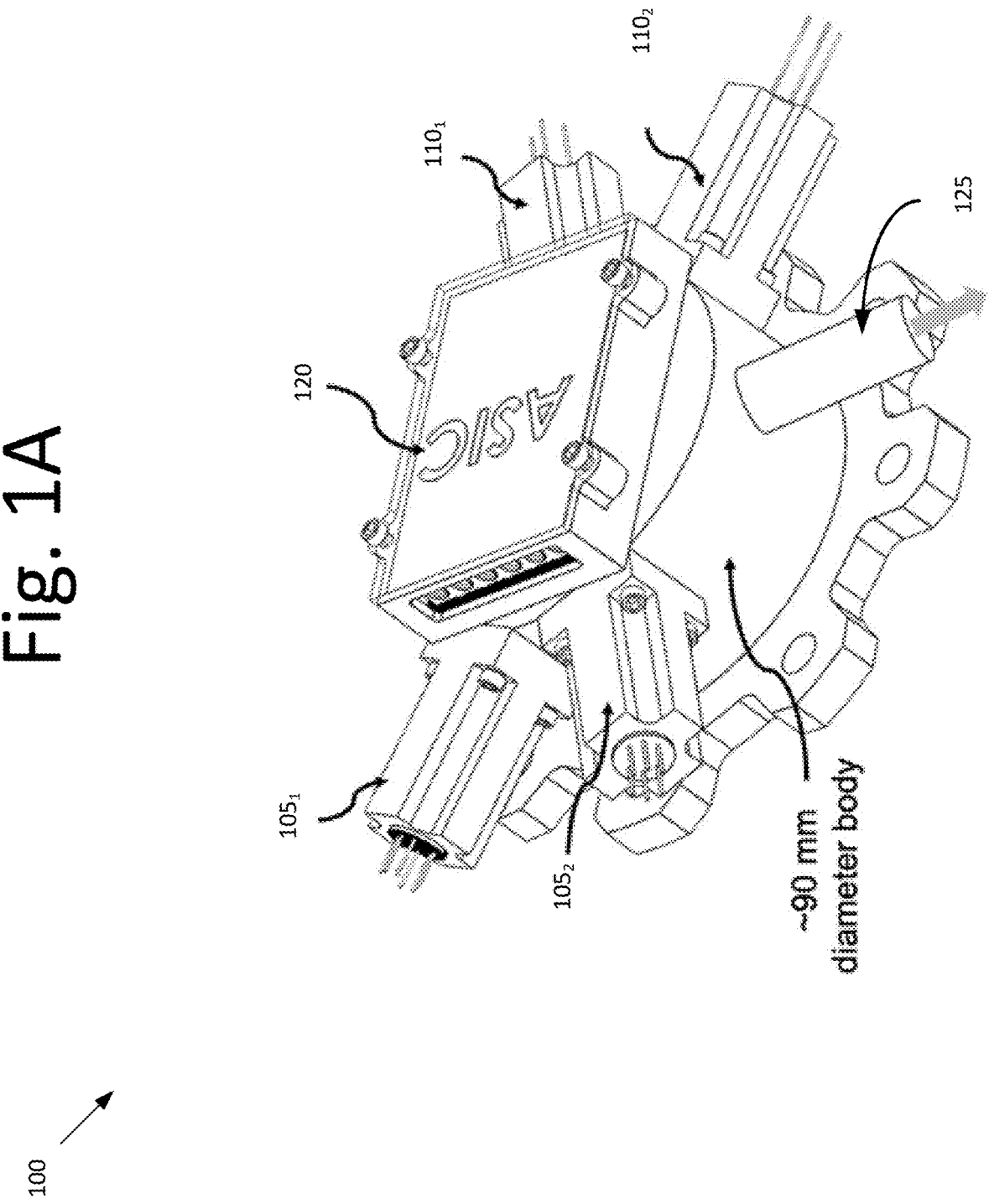
FIGS. 1A and 1B are diagrams illustrating perspective views of NDIRGA, according to an embodiment of the present invention.

Some embodiments generally pertains to a gas analyzer, and more particularly, to a NDIRGA configured to measure and quantify vapor partial pressures of water ($H_2O$) and carbon dioxide ($CO_2$) evolved from a cold comet sample, as a function of temperature and time, during the critical period of sample warming and subsequent gas transfer process from a sealed sample containment system (SCS) to a gas containment system (GCS) or separate reservoir. Although the embodiment of this invention is described as a space based application, this present invention has also many industrial applications for detection of gases, that have strong absorption bands in the 2-to-7 μm spectral wavelength bands, on Earth.

In some embodiments, the NDIRGA is configured to measure partial pressures of water and $CO_2$ during gas transfer of cometary volatiles from a sealed solid cometary sample into a separate reservoir (e.g., the GCS). The measurements may be performed by a thermopile integrated with bandpass filters (quad filter-detector), which measure the absorption of infrared (IR) radiation of the target gases at specific wavelength bandwidths. In one embodiment, the NDIRGA uses a quad thermopile detector integrated with four narrow band passband optical infrared filters. The infrared filter passband that resides within the $H_2O$ and $CO_2$ absorption bands may serve as the gas detection channels, and the infrared filter that resides outside of the target gas absorption bands may serve as the reference channel. These optical bandpass filters may be centered at wavelengths 2.7 μm and 6.6 μm for $H_2O$ detection, 4.25 μm for $CO_2$ detection and 4.0 μm for detection of a reference signal. Simplistically, the ratio of the gas detection channel voltage signal to reference channel voltage signal allows for the concentration of the target gas to be determined.

NDIRGA partial pressure measurements of $H_2O$ and $CO_2$ during gas transfer ensures that the water partial pressure never exceeds the triple point of pure water (4.58 Torr at 273.01 K), thereby avoiding the possibility of formation of liquid water that could alter the solid sample or the production of an ice plug (water freezing) that would hinder the flow of volatiles into the reservoir or worse rupture the gas transfer tube. In addition, knowledge of the partial pressure of water in the system is critical to establishing when the water vapor transfer from the solid sample containment system to the gas containment system was finished. NDIRGA $CO_2$ measurements help understand how much $CO_2$ gas was lost from the gas containment system when the background pressure becomes too high during transfer and gas venting.

In some embodiments, the calibration procedure relies on Schwarzchild's equation for radiative transfer. The Schwarzschild's equation for the transmission of radiation through an absorbing and/or emitting medium in local thermodynamic equilibrium [Kirchhoff's law: photons are absorbed and re-emitted as the local temperature T, and source function $S_\lambda = B_\lambda(T)$] is given by:

$$dI_\lambda = n\sigma_\lambda [B_\lambda(T) - I_\lambda] ds = \alpha_\lambda [B_\lambda(T) - I_\lambda] ds \qquad \text{Equation (1)}$$

where n is the molecular density [number per unit volume], $\sigma_\lambda$ is the absorption cross section at wavelength λ [cm$^2$], $\alpha_\lambda$ is the absorption coefficient at wavelength λ [cm$^{-1}$], $B_\lambda(T)$ is the Planck function for temperature T and wavelength λ, $I_\lambda$ is the spectral density of the radiation at the wavelength λ entering the medium and $dI_\lambda$ is the incremental change in spectral density through the medium after the distance ds.

The transfer equation can also be expressed using the variable $\tau_\lambda$, called the optical depth, defined by:

$$d\tau_\lambda = \alpha_\lambda ds \qquad \text{Equation (2)}$$

or $$\tau_\lambda(s_1, s_2) = \int_{s_1}^{s_2} \alpha_\lambda ds \qquad \text{Equation (3)}$$

The solution of the transfer equation can now be expressed as:

$$\frac{dI_\lambda}{d\tau_\lambda} - I_\lambda = -B_\lambda(T) \qquad \text{Equation (4)}$$

$$\frac{d}{d\tau_\lambda}(I_\lambda e^{-\tau_\lambda}) = -B_\lambda(T)e^{-\tau_\lambda} \qquad \text{Equation (5)}$$

integrating $$[I_\lambda(0) e^{-\tau_\lambda}]_{\tau_1}^{\tau_2} = -\int_{\tau_1}^{\tau_2} e^{-x} B_\lambda(x) dx \qquad \text{Equation (6)}$$

$$I_\lambda(\tau_1) = I_\lambda(0) e^{-(\tau_2 - \tau_1)} + \int_{\tau_1}^{\tau_2} B_\lambda(x) dx \qquad \text{Equation (7)}$$

The first term shows that the intensity originating at $\tau_2$ decreases by an exponential factor to $\tau_1$. The second term shows that the contribution to the intensity by the internal emission along the path from $\tau_2$ to $\tau_1$ also decreases by an exponential factor.

Now assuming that the source contribution is independent of the location, $\tau_1=0$, $\tau_2=\tau_\lambda$ we obtain:

$$I_\lambda(\tau_1) = I_\lambda(0)e^{-\tau_\lambda} + B_\lambda(T)\int_{\lambda_1}^{\lambda_2} e^{-x} dx \qquad \text{Equation (8)}$$

$$I_\lambda(\tau_1) = I_\lambda(0)e^{-\tau_\lambda} + B_\lambda(T)(1-e^{-\tau_\lambda}) \qquad \text{Equation (9)}$$

The first term corresponds to the Beer law. The second term can be omitted for applications that are spectrally away from the background thermal infrared.

To increase sensitivity and to measure and quantify the vapor partial pressure of water down to <0.03 Torr, the effect of background thermal radiation should be accounted for. As an example, it is noted that $T_{req}^{2.7} \approx 0.99998 \approx 1-2e^{-5}$ and $T_{req}^{6.6} \approx 0.99997 \approx 1-3e^{-5}$ for the corresponding transmissions of the two water sensitive channels for 0.01 Torr water in the gas cell. Over the emission range of the IR source, it is calculated that the average absorption coefficient is $\approx 4e^{-6}$.

In the present invention, the source is nominally delivering 8 mW of power during a pulse of 50 seconds, i.e., 0.4 J per cycle. Assuming that the gas cell is perfectly sealed with an interval volume of 8 cm³, thermally isolated and then using a heat capacity of 1850 J/(kg K), it is estimated that the gas temperature will rise by about $\Delta T \approx 9K$.

Assuming that the temperature of the gas is $T \approx 290$ K, the change of thermal emission relative to the source emission is given by:

$$\Delta B_{\lambda 1}^{\lambda 2} = \int \frac{B_\lambda(\tau + \Delta T) - B_\lambda(T)}{I_\lambda} d\lambda \qquad \text{Equation (10)}$$

where the emission over each gas channel is $\Delta B_{2.6}^{2.8} \approx 9e^{-9}$ and $\Delta B_{6.5}^{6.7} \approx 4e^{-6}$, meaning that even with some conservative assumptions the relative change of thermal emission is smaller by at least one order of magnitude than the required detection limit.

The radiative transfer equations can be implemented by defining the following parameters:

$I_\lambda(0)$ correspond to the flux provided by the infrared source, collimated and entering the gas cell. The source is either ON or OFF, leading to the upper script [on, off, p2p—for peak-to-peak=on-off]

$\tau_\lambda$ is the optical depth, and $e^{-\tau_\lambda}$ is the transmittance. The HITRAN spectroscopic database was used to calculate these values for various pressure.

$B_\lambda(T)$ is blackbody emission of the gas inside the cell at the temperature T around [typically around 243 K]

$I_\lambda(\tau_1)$ correspond to the flux reaching the top of each thermopile. Later on, we will use lowerscript REF and GAS to identify the flux corresponding to the reference channel [4 μm] or the volatile channel [2.7, 4.2, 6.6 μm]

The integrated flux reaching each thermopile with an effective spectral responsivity [$R_\lambda$]—which included the transmission of the pair of plano-convex lenses (CaF$_2$), each bandpass spectral filter [center wavelengths: 2.7/4.2/6.6 μm] and the thermal sensitivity of the thermopile—is converted into voltage [V].

$$V = \int_{\lambda_1}^{\lambda_2} i_\lambda R_\lambda d\lambda \qquad \text{Equation (11)}$$

This analog is in turn biased, amplified and digitized by the MCD ASIC.

$$DN \equiv V + V_{bias} \qquad \text{Equation (12)}$$

or $$DN \equiv \int_{\lambda_1}^{\lambda_2} R_\lambda [I_\lambda(0)e^{-\tau_\lambda} + B_\lambda(T)(1-e^{-\tau_\lambda})] d\lambda + V_{bias}^{ON} \qquad \text{Equation (13)}$$

By using alternating measurements with the source turned on and off, we obtain peak to peak measurement:

$$DN^{p2p} = DN^{ON} - DN^{OFF} \qquad \text{Equation (14)}$$

$$DN^{p2p} \equiv \int_{\lambda_1}^{\lambda_2} R_\lambda [I_\lambda(0)e^{-\tau_\lambda} + B_\lambda(T+\Delta T)(1-e^{-\tau_\lambda})] d\lambda + \\ V_{bias}^{ON} - \int_{\lambda_1}^{\lambda_2} R_\lambda [B_\lambda(T)(1-e^{-\tau_\lambda})] d\lambda - V_{bias}^{OFF} \qquad \text{Equation (15)}$$

Regarding background thermal emission, and assuming that the bias voltage is stable over the cycle, the above expression from Equation (15) reduces to:

$$DN^{p2p} \equiv \int_{\lambda_1}^{\lambda_2} R_\lambda [I_\lambda(0)e^{-\tau_\lambda}] d\lambda \qquad \text{Equation (16)}$$

The average incident flux is defined as:

$$\bar{I}^{p2p} = \frac{\int_{\lambda_1}^{\lambda_2} R_\lambda I_\lambda d\lambda}{\int_{\lambda_1}^{\lambda_2} R_\lambda d\lambda} \qquad \text{Equation (17)}$$

So, for a narrow bandpass filter:

$$DN^{p2p} \equiv \bar{I}^{p2p} \int_{\lambda_1}^{\lambda_2} R_\lambda e^{-\tau_\lambda} d\lambda \qquad \text{Equation (18)}$$

Therefore, the following pair measurement is obtained:

$$DN_{REF}^{p2p} = \bar{I}_{REF}^{p2p} \qquad \text{Equation (19)}$$

$$DN_{GAS}^{p2p} \equiv \bar{I}_{GAS}^{p2p} \int_{\lambda_1}^{\lambda_2} R_\lambda e^{-\tau_\lambda} d\lambda = \bar{I}_{GAS} Tr_{GAS}(P_{GAS}, T) \qquad \text{Equation (20)}$$

Where $Tr_{GAS}(P_{GAS})$ is the total transmittance for a given channel, which function of the partial pressure $P_{GAS}$ and temperature T Based on the above:

The linear relationship between the two channels can be established so that the reference channel can be used to estimate what the incident flux for the gas channel would be.

The total transmittance over each spectral channel for various temperature can be calculated so that a monotonically varying look-up table for $Tr_{GAS}(P_{GAS}, T)$ can be defined. The same table can then be used to do an inverse search $[P_{GAS}(Tr_{GAS}, T)]$ The procedure to derive the vapor partial pressure is as follows:

1. Use $DN_{REF}^{p2p}$ to obtain an estimate of the $\widetilde{DN}_{GAS}$, $\sigma^{p2p} = \alpha \, DN_{REF}^{p2p} + \beta$
2. Calculate the transmitted ratio:

$$Tr_{GAS} = \frac{DN_{GAS}^{p2p}}{\widetilde{DN}_{GAS,o}^{p2p}}$$

3. Do the inverse search $P_{GAS}(Tr_{GAS}, T)$

Figure 1B:
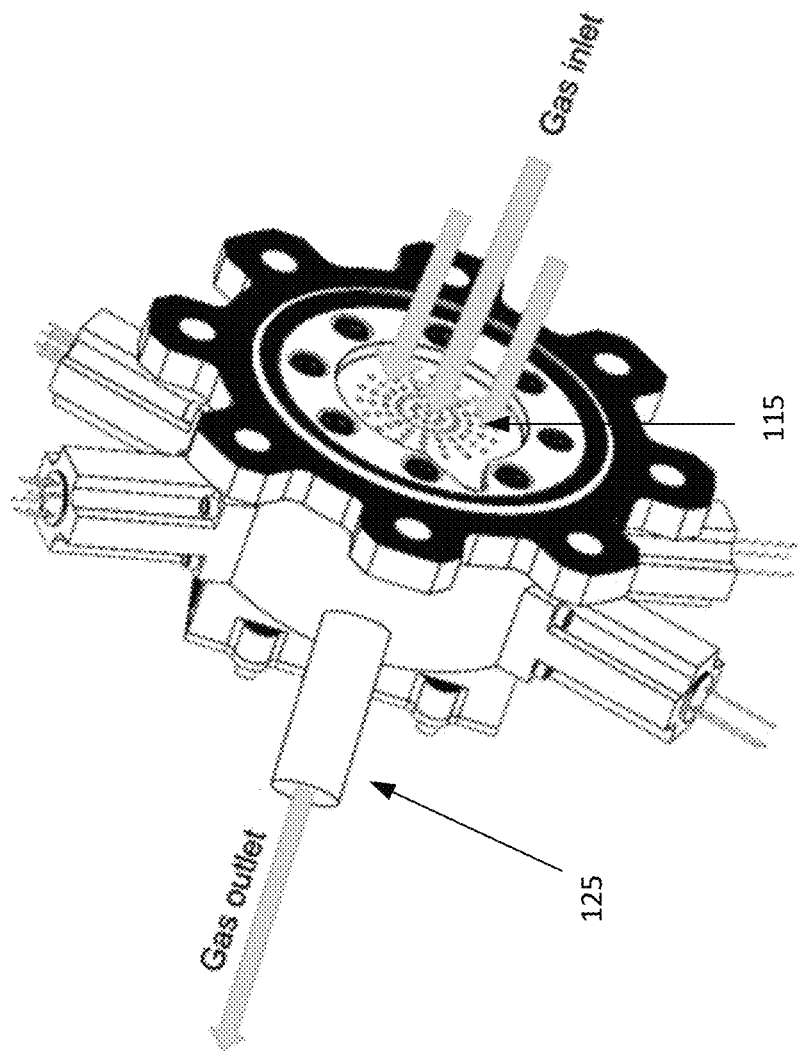

FIGS. 1A and 1B are diagrams illustrating perspective views of NDIRGA 100, according to an embodiment of the present invention. In some embodiments, NDIRGA 100 includes a plurality of inlets 115 that allow a gas mixture to flow through a particle filter (not shown). In an embodiments, particle filter may be a HEPA filter. Inlets 115 may allow gas flow or diffuse into NDIRGA 100 via a HEPA filter. Depending on the HEPA filter specification, the HEPA filter may filter out varying sizes of particles or debris. Once inside NDIRGA 100, the gas may flow between an IR source (housed within IR source housing 1101 and 1102) and the filter-thermopile (housed within the quad filter-detector housings 1051 and 1052) line of sight. For purposes of explanation, gas may be carbon dioxide, or any type of common industrial gas with strong absorption features within the 2 to 7 µm spectral wavelength range (useful range of broadband IR source). For example, one or more channels can detect a gas such as methane ($CH_4$), ethane ($C_2H_6$) or nitrous oxide ($N_2O$), when using the appropriate passband filters for their absorption bands. Although not shown, within NDIRGA 100 is a volume of space or gas cell. Within this volume, the IR sources may transmit IR broadband radiation, and depending on the gas inside of this volume, quad filter-detectors may detect the gas. The gas flowing into NDIRGA 100 via a HEPA filter is free from particles and debris, the size of particles depending on the HEPA filter specification.

In this embodiment, the NDIRGA 100 has two quad filter-detectors in housings 1051, 1052 and two IR sources in housings 1101, 1102, i.e., two paired sets. It should be appreciated that the embodiments are not limited to two quad filter-thermopiles and two IR sources. During operation, one paired set of quad filter-thermopile and IR source may be used for monitoring and quantification of water and $CO_2$ vapor partial pressures. The inclusion of the second paired set of quad filter-thermopile and IR source ensures that if there is a failure in either the operation of the quad filter-thermopile or IR source in the first set that either the second paired set, or only one part of that set can be implemented. This allows for risk reduction in remote applications through redundancy. Furthermore, if the IR source of the first set loses emission intensity during operation, then the second IR source can be implemented. In another embodiment, if the second thermopile is integrated with a different spectral filter set, then other gas species can be monitored and quantified at the same time or at a later time.

As shown in FIG. 1B, gas may diffuse out through the outlet tube 125, which in this embodiment, is on the side of NDIRGA 100 cylinder body.

In some embodiments, ASIC 120 is configured to amply, sample, and digitize thermoelectric voltages generated by the absorbed IR light on quad thermopile detectors. From there, the digitized signals from ASIC 120 are communicated to a FPGA board in the main electronic box (MEB) for further data processing. See MEB 304 of FIG. 3. Although not shown in detail, power and telemetry for space applications are provided through an umbilical cable and retraction arm. The retraction arm is derived from similar mechanisms flown on several space mission, and has a cable-synchronized linkage that provides deterministic motion.

Figure 2A:
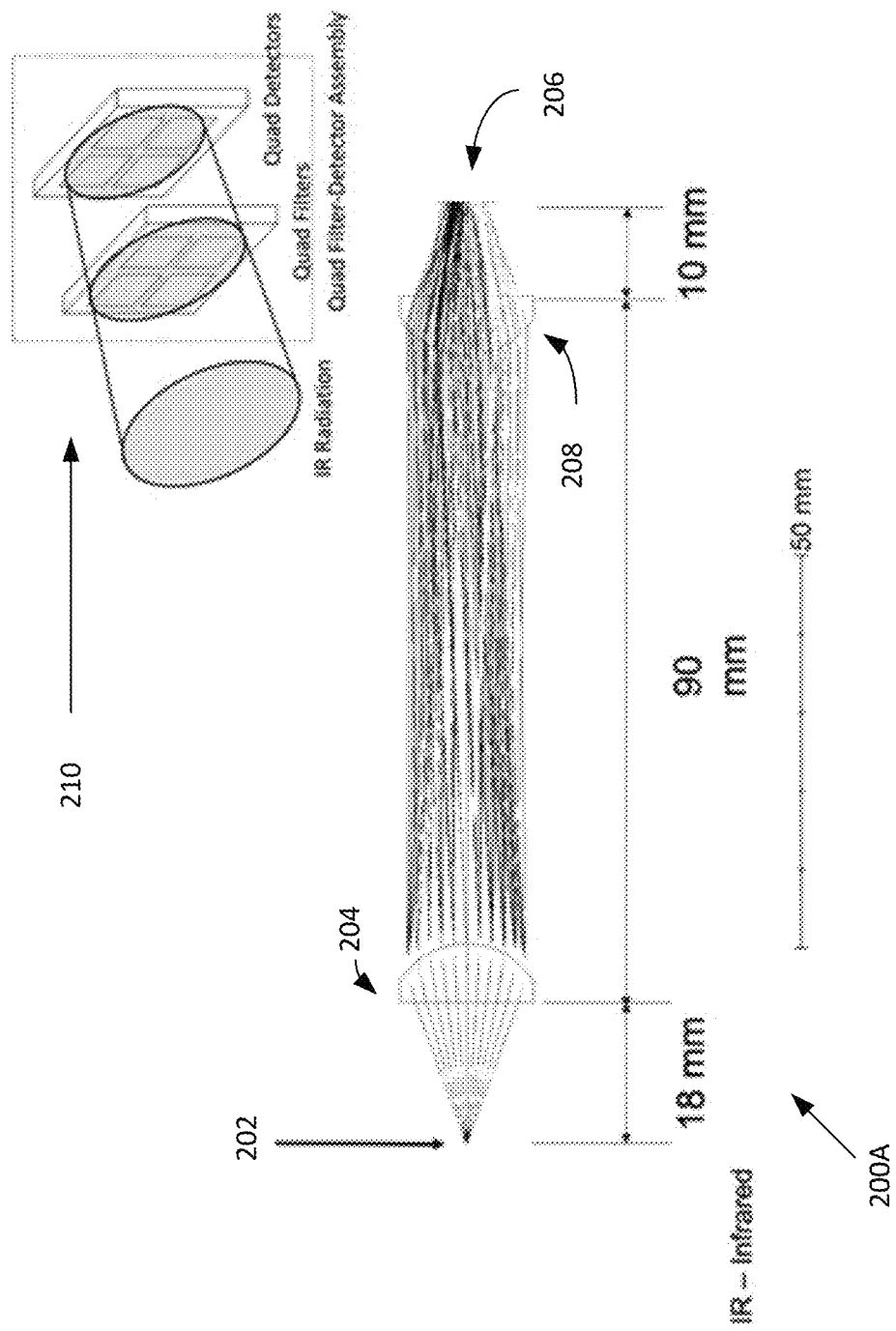
FIG. 2A is an illustration of an optical ray trace simulation of radiation emitted from an IR source, collimated using an infra transmitting lens, going through the NDIRGA internal volume (gas cell) and focused using another infrared transmitting lens, onto a quad detector after passing through integrated bandpass filters, for a single optical path configuration, according to an embodiment of the present invention.
Figure 2B:
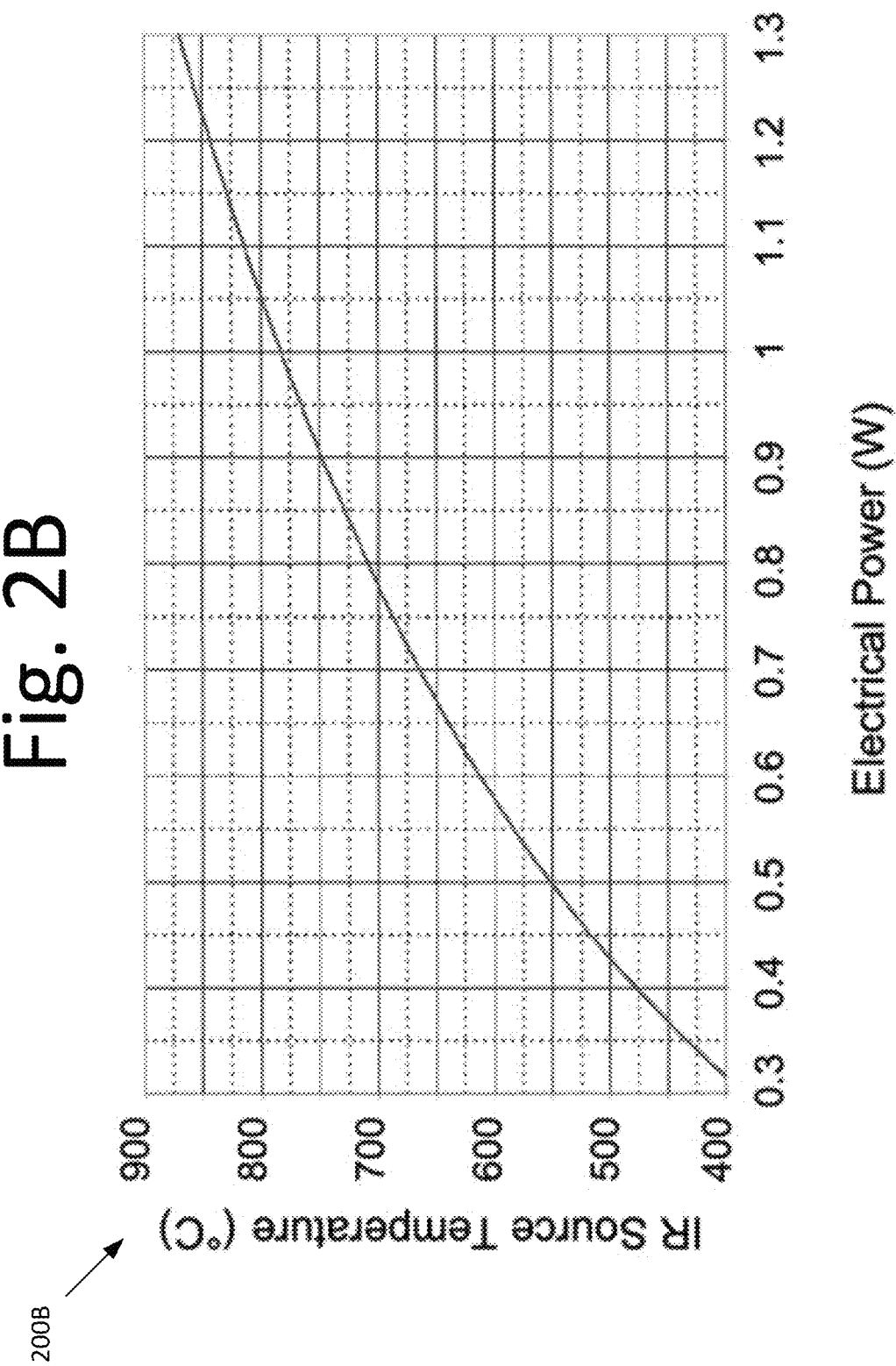
FIG. 2B is a graph illustrating the relationship of IR source temperature as a function of input electrical power, according to an embodiment of the present invention.

FIG. 2A is an illustration of an infrared optical ray trace 200A through a gas cell for a single optical path, according to an embodiment of the present invention. In some embodiments, a collimating lens 204 is placed near IR source 202 and a focusing lens 208 may be placed near quad filter-detector 206. For example, IR source 202 may generate a pulse at different frequencies that are collimated through collimating lens 204. A focusing lens 208 receives the pulsed radiation and focuses it onto the quad filter-detector 206 through the quad filter to detect the radiation intensity of the integrated spectral passband frequencies. FIG. 2B also shows how the focused pulsed radiation impinges on the quad filters and subsequently the quad detectors. See numeral 210. In some embodiments, the separation of the quad filters and quad detectors is ~1 mm. It should be appreciated that this is based on the system's requirements.

Figure 2C:
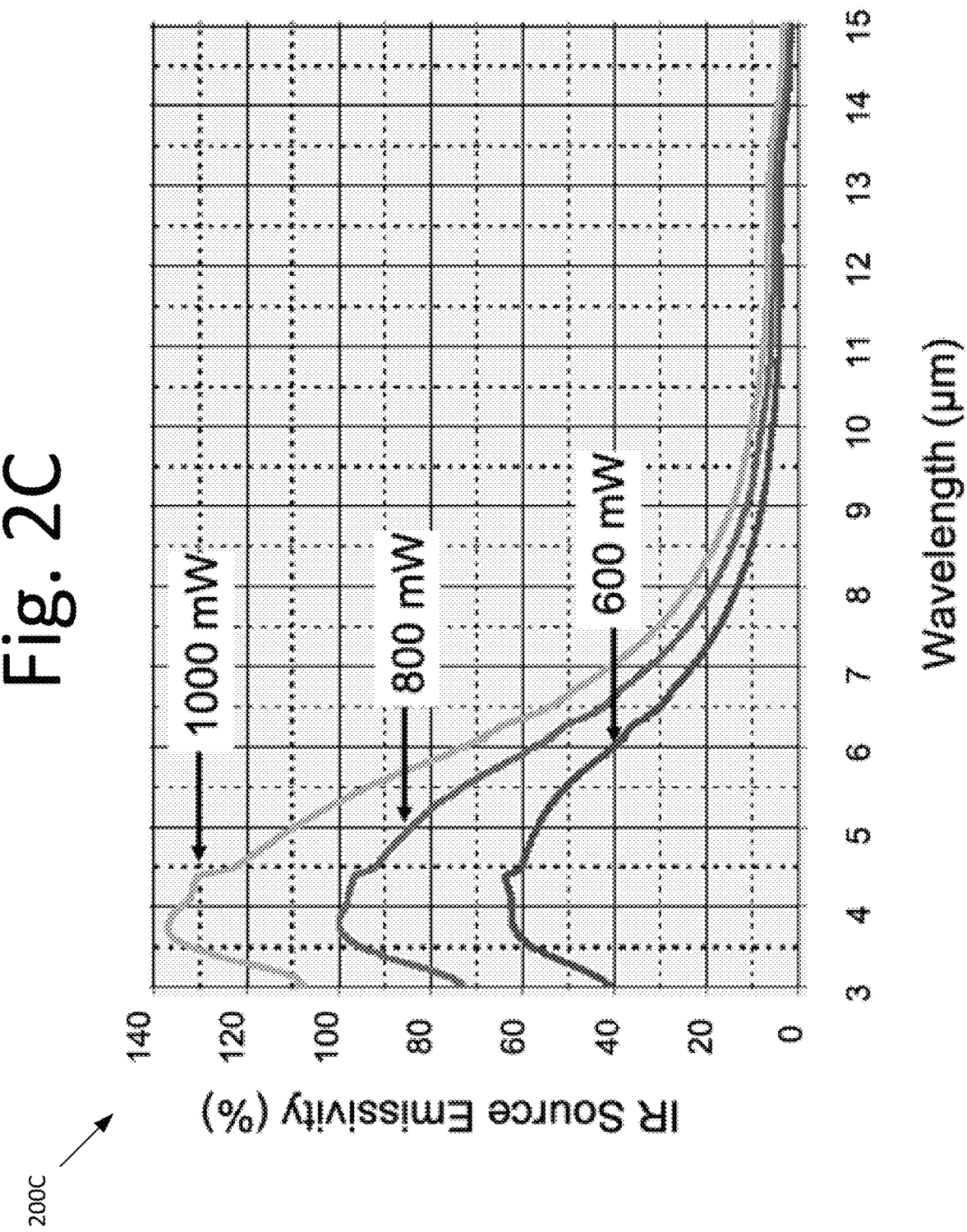
FIG. 2C is a graph illustrating the relationship of the IR source emissivity as a function of wavelength, according to an embodiment of the present invention.

The exitance, M, for a source of area, $A_s$, at a distance, d, is related to the temperature, T, and emissivity, $\epsilon$, by $M = \epsilon \sigma T^4 A_s / \pi d^2$, where $\sigma$ is the Stefan-Boltzmann constant. FIG. 2B is a graph 200B illustrating how the temperature, T, of the IR source can be changed by changing the input electrical power to the IR source. FIG. 2C is a graph 200C illustrating the relationship of the emissivity, e, as a function of wavelength for three input electrical power settings to the IR source. In FIG. 2D, quad filter-detector 206 is shown schematically with four filters placed in front of the detectors (see also FIG. 2A). Each filter-detector combination within the quad in this embodiment represents a filter spectral channel with a defined spectral bandwidth. The four bandpass filter channels chosen in this embodiment are channel 1: 2.7±0.1 µm with >70% peak transmission, for $H_2O$ detection; channel 2: 6.58±0.2 µm with >65% peak transmission also for $H_2O$ detection; channel 3: 4.0±0.11 µm with >75% transmission, for reference signal detection, and channel 4: 4.25±0.08 µm with >75% peak transmission, for $CO_2$ detection.

Figure 3:
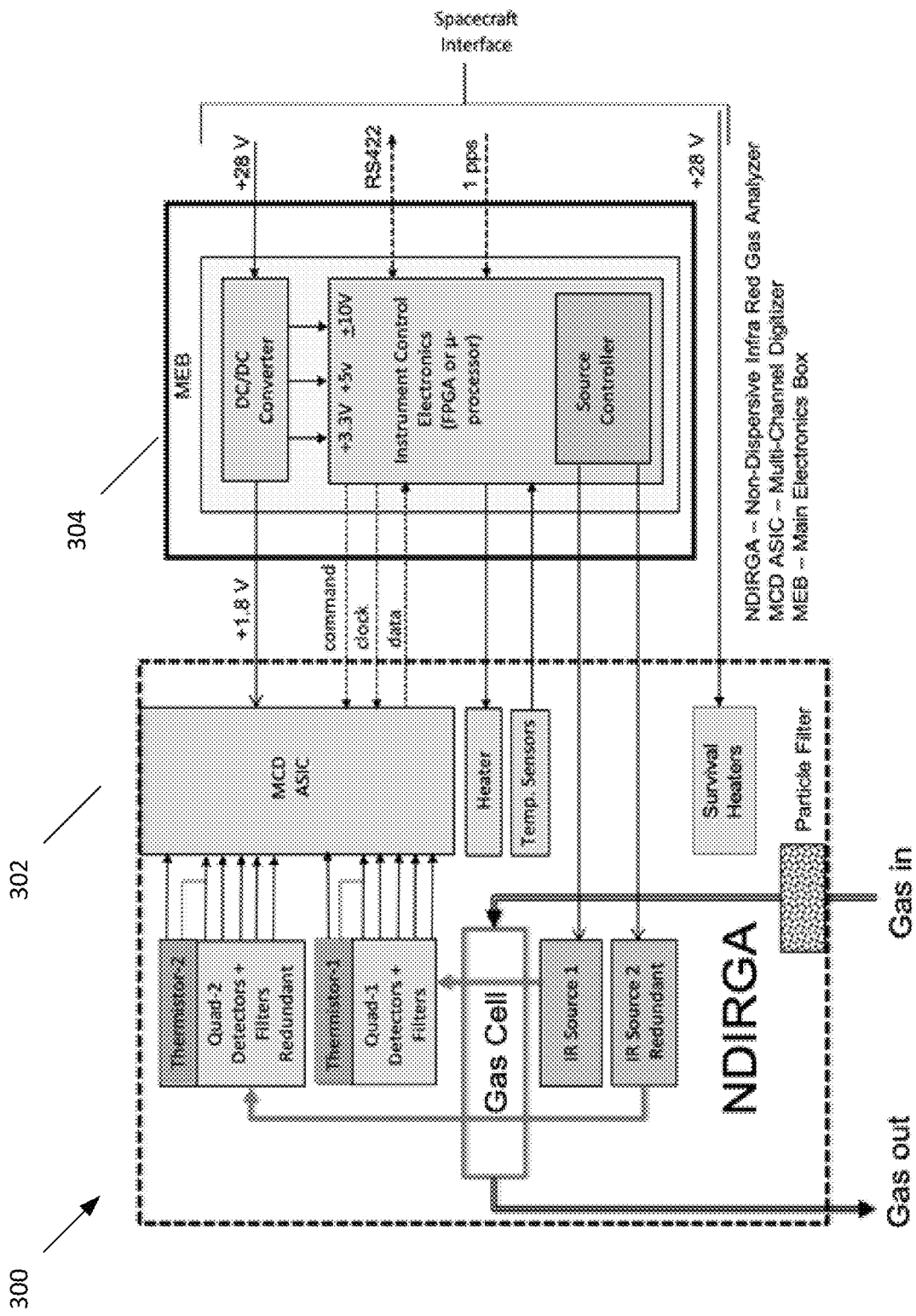
FIG. 3 is a system block diagram illustrating the functional elements of the NDIRGA, according to an embodiment of the present invention.

FIG. 3 is a block diagram illustrating NDIRGA 300, according to an embodiment of the present invention. In an embodiment, NDIRGA 300 includes a MCD ASIC 302 configured to receive data from NDIRGA 300 and MEB 304. In this embodiment, MCD ASIC 302 has twenty readout channels, each of which include zero-offset variable gain amplifiers driving a dedicated low-noise second-order sigma-delta A/D converter (SDADC) to digitize microvolt signals. The channels of MCD ASIC 302 interface directly to thermopile outputs and amplify/digitize the signals with variable gain/resolution. Up to 24-bit digitization of the signals can be effectively attained by using the analog front-end gain and oversampling ratio.

Figure 4:
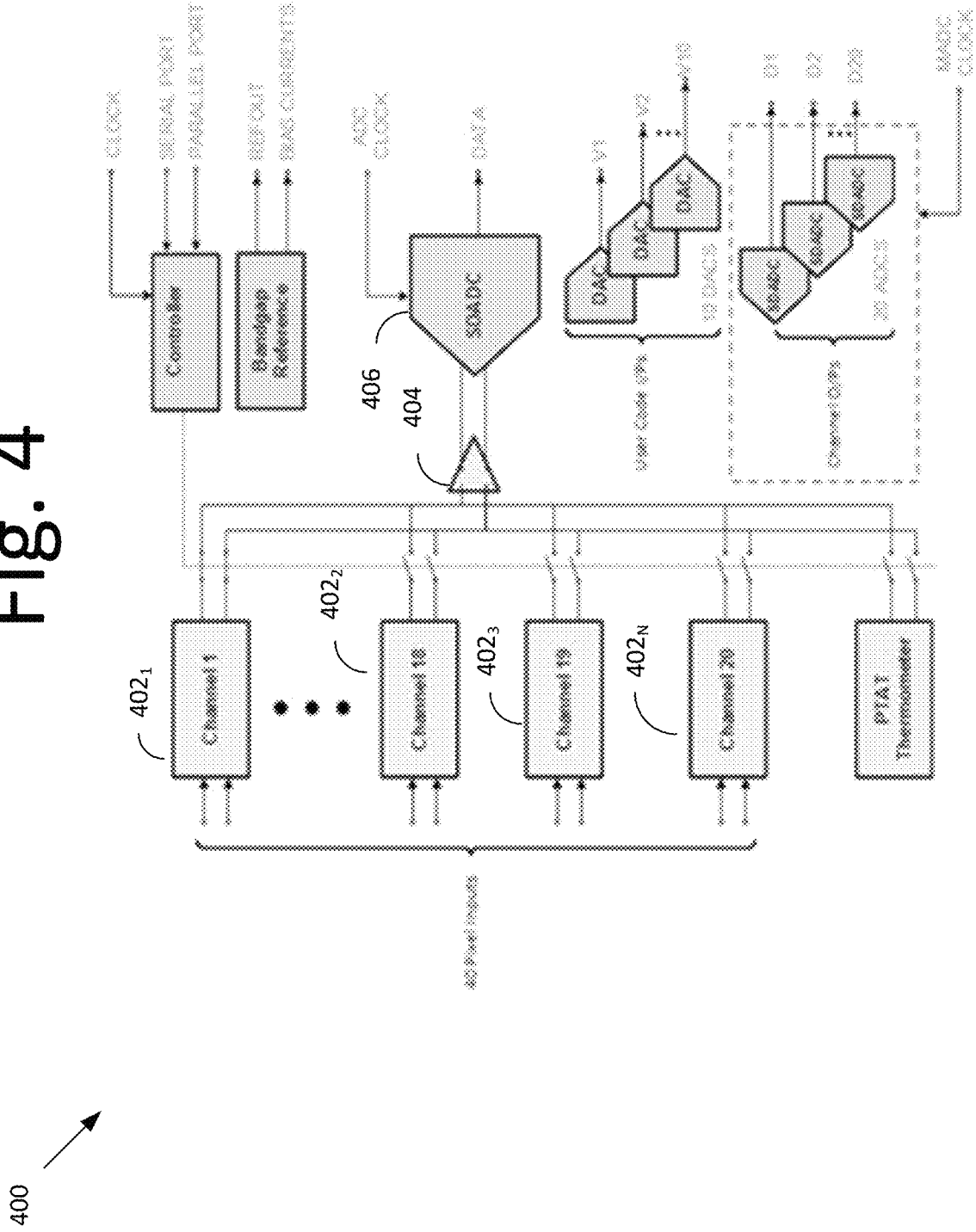
FIG. 4 is a circuit block diagram illustrating a multichannel digitizer (MCD) application-specific integrated circuit (ASIC) for low noise front end electronic readout of thermopile detectors, according to an embodiment of the present invention.

FIG. 4 is a circuit block diagram illustrating a MCD ASIC 400 for low noise front end readout of thermopile detectors, according to an embodiment of the present invention. In some embodiment, MCD ASIC 400 is an analog-to-digital converter (ADC) that receives microvolt signals (e.g., 50 µV) by way of its channels 4021, 4022, 4023, . . . 40220. Depending on the embodiment, MCD ASIC 400 has approximately 20 channels. However, this may depend on the system requirements. MCD ASIC 400 separately or concurrently amplifies by way of an amplifier 404 the microvolt signals, followed by digitizing each of the amplified signals. For example, the amplified signal may be digitized from 12 bits to 24 bits. MCD ASIC 400 is controlled by a Field Programmable Gate Array (FPGA) through SPI protocol. The ASIC EA modulator with a digital Sinc filter removes the high frequency noise and decimates the single bit stream to a high-resolution data word. The combination of oversampling ratio (OSR) and the filter determines the output bandwidth and the frequency response, resulting in a dramatic reduction in the 1/f noise of the amplified signal. According to an embodiment, implementing a $3^{rd}$ order Sinc filter on the FPGA, with a modulation frequency of, $f_{mod}$=250 kHz, and OSR=1024, a decimation of a single bit stream into 24-bit data words is obtained.

MCD ASIC 400 continues with sampling (or averaging) the digitized signals However, depending on the embodiment, MCD ASIC 400 may perform the sampling prior to digitizing the amplified signal.

In other words, readout of the thermopile voltages may be performed by the MCD ASIC 400. This MCD ASIC 400 is a custom designed radiation hardened CMOS chip manufactured in a 180 nm CMOS process. The MCD for the NDIRGA has the capability of using up to 20 independent amplifier channels with variable gain, automatic offset reduction, integration, and digitization. Each channel is connected to its own SDADC with a resolution determined by the user. Each channel has the ability to operate in a 2:1 interleaved mode, thus doubling the number of inputs that can be digitized up to a total of forty.

The ASIC in some embodiments is controlled, via a serial port interface (SPI), while data from the ADCs streams continuously back to MEB via CMOS or low voltage differential signal (LVDS) paths. The ASIC also contains ten digital to analog converters (DACs) so as to generate all required reference voltages both for itself and the thermopiles. An on-chip digital thermometer allows the ASIC to provide junction temperature measurements for gain calibration. Thermistor or diode based temperature sensors in the thermopile package can also be digitized for calibration of the thermopile signals.

As shown in FIG. 4, channel SDADC 406 is configured to average the integrator outputs for increased thermal noise filtering. Multiple channels can be digitized in parallel.

Figure 5:
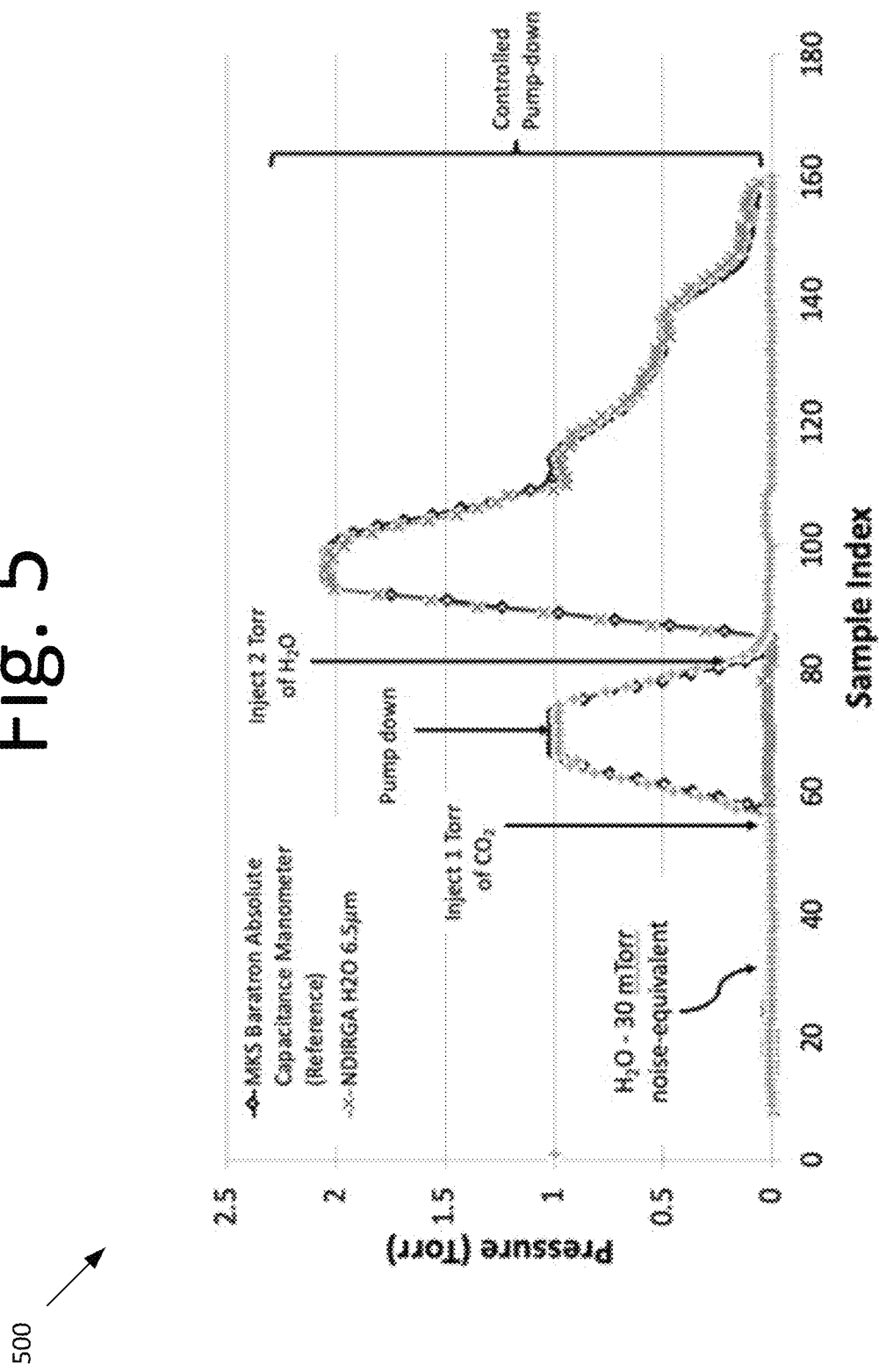
FIG. 5 is a graph illustrating measured results $H_2O$ and $CO_2$ vapor partial pressure using the NDIRGA, according to an embodiment of the present invention.

FIG. 5 is a graph 500 illustrating results obtained in thermal-vacuum of the NDIRGA. The results demonstrate simultaneous $H_2O$ and $CO_2$ partial pressure measurements showing 0.03 Torr $H_2O$ partial pressure uncertainty (based on 40 LSB noise). The results show very good correlation with total pressure measurements from a commercial capacitance monometer used as a reference measurement.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus for measuring vapor partial pressures of water and carbon dioxide, comprising:
   a pair of infrared (IR) sources and a pair of quad filter detectors are placed opposite to one another such that the vapor partial pressures of water ($H_2O$) and carbon dioxide ($CO_2$) are measured in a pathlength gas cell of a predetermined length;
   a collimating lens placed near each IR source configured to collimate a pulse radiation generated at different frequencies by a corresponding one of the IR sources;
   a focusing lens placed near each quad filter-detector configured to receive the pulsed radiation and focus the pulsed radiation onto a corresponding one of the quad filter-detectors, the corresponding one of the quad filter-detectors configured to detect a radiation intensity of an integrated spectral passband frequencies;
   whereby the focusing lens is configured to receive the pulsed radiation and focus said pulsed radiation onto each quad filter-detector through the quad filter-detector to detect the radiation intensity of the integrated spectral passband frequencies, with an exitance, M, for a source of area, $A_s$, at a distance, d, is related to the temperature, T, and emissivity, $\epsilon$, by $M=\epsilon\sigma T^4 A_s/\pi d^2$, where $\sigma$ is the Stefan-Boltzmann constant.

2. The apparatus of claim 1, further comprising:
a plurality of inlets configured to allow gas to flow or diffuse into the gas cell via a particle filter, wherein
the particle filter is configured to prevent sizes of particles outside of a predetermined size and/or debris from entering the gas cell.

3. The apparatus of claim 2, wherein the particle filter is a HEPA filter.

4. The apparatus of claim 1, wherein the gas flows in a line of sight between one or both of the IR sources and one or both of the quad filter-detectors.

5. The apparatus of claim 4, wherein the one or both of the IR sources is configured to transmit an IR broadband radiation through the gas cell.

6. The apparatus of claim 5, wherein one or both of the quad filter-detector is configured to detect a type of gas depending on the gas inside of the gas cell.

7. The apparatus of claim 1, wherein the gas is diffused out of the gas cell by way of an outlet tube.

8. The apparatus of claim 1, wherein each quad filter-detector comprises four filters and four detectors, the four filters being placed in front of the four detectors.

9. The apparatus of claim 1, further comprising:
a multi-channel digitizer (MCD) application-specific integrated circuit (ASIC) is an analog-to-digital converter (ADC) configured to receive microvolt signals by way of a plurality of channels.

10. The apparatus of claim 9, wherein the MCD ASIC is configured to separately or concurrently amplify each of the microvolt signals, digitize each of the amplified signals, and sample each of the digitized signals.

11. The apparatus of claim 9, wherein the MCD ASIC is a radiation hardened CMOS chip manufactured in a 180 nm CMOS process.

12. The apparatus of claim 9, wherein each of the plurality of channels are connected to a corresponding low-noise second-order sigma-delta A/D converter (SDADC) with a predetermined resolution.

13. The apparatus of claim 9, wherein each of the plurality of channels operates in a 2:1 interleaved mode, doubling a number of inputs for purposes of digitizing the received microvolt signals.

14. An apparatus, comprising:
a pair of infrared (IR) sources and a pair of quad filter detectors are placed opposite to one another such that the vapor partial pressures of water ($H_2O$) and carbon dioxide ($CO_2$) are measured in a short pathlength gas cell; and
a plurality of inlets configured to allow gas to flow or diffuse into the gas cell via a particle filter, wherein
the particle filter is configured to prevent particles outside of a predetermined size range and/or debris from entering the gas cell;
a collimating lens placed near each IR source configured to collimate a pulse radiation generated at different frequencies by a corresponding one of the IR sources;
a focusing lens placed near each quad filter-detector configured to receive the pulsed radiation and focus the pulsed radiation onto a corresponding one of the quad filter-detectors, the corresponding one of the quad filter-detectors configured to detect a radiation intensity of an integrated spectral passband frequencies;
whereby the focusing lens is configured to receive the pulsed radiation and focus said pulsed radiation onto each quad filter-detector through the quad filter-detector to detect the radiation intensity of the integrated spectral passband frequencies, with an exitance, M, for a source of area, $A_s$, at a distance, d, is related to the temperature, T, and emissivity, $\epsilon$, by $M=\epsilon\sigma T^4 A_s/\pi d^2$, where $\sigma$ is the Stefan-Boltzmann constant.

15. The apparatus of claim 14, wherein the gas flows in a line of sight between one or both of the IR sources and one or both of the quad filter-detectors.

16. The apparatus of claim 15, wherein the one or both of the IR sources is configured to transmit an IR broadband radiation through the gas cell.

17. The apparatus of claim 16, wherein one or both of the quad filter-detector is configured to detect a type of gas depending on the gas inside of the gas cell.

18. The apparatus of claim 14, wherein the gas is diffused out of the gas cell by way of an outlet tube.

* * * * *